United States Patent
Takagi et al.

(10) Patent No.: US 6,740,991 B2
(45) Date of Patent: May 25, 2004

(54) CURRENT NOISE INSULATED SPINDLE MOTOR

(75) Inventors: Keiichi Takagi, Saitama-ken (JP); Seiichi Yamazaki, Saitama-ken (JP); Hiroyuki Fueki, Saitama-ken (JP); Toshiyuki Kaneko, Saitama-ken (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/789,740

(22) Filed: Feb. 22, 2001

(65) Prior Publication Data

US 2001/0017494 A1 Aug. 30, 2001

(30) Foreign Application Priority Data

Feb. 28, 2000 (JP) .......................... 2000-056067

(51) Int. Cl.$^7$ .............................. H02K 5/24; H02K 1/04; H02K 5/00
(52) U.S. Cl. ................................ 310/51; 310/43; 310/91
(58) Field of Search ........................... 310/43, 51, 91

(56) References Cited

U.S. PATENT DOCUMENTS

| | | | | |
|---|---|---|---|---|
| 4,227,134 A | * | 10/1980 | Haner ........................ 318/685 |
| 4,845,393 A | * | 7/1989 | Burgess et al. ............... 310/51 |
| 5,005,089 A | * | 4/1991 | Thanos et al. ............ 360/77.08 |
| 5,089,732 A | * | 2/1992 | Konno et al. ............. 310/67 R |
| 5,274,288 A | * | 12/1993 | Stefansky ..................... 310/90 |
| 5,313,126 A | * | 5/1994 | Forsythe et al. .............. 310/51 |
| 5,334,895 A | * | 8/1994 | Morioka et al. .......... 310/67 R |
| 5,376,850 A | * | 12/1994 | Elsing et al. ............. 310/67 R |
| 5,517,375 A | * | 5/1996 | Dion et al. .............. 360/98.07 |
| 5,555,537 A | * | 9/1996 | Imaino et al. ............... 369/109 |
| 5,654,847 A | * | 8/1997 | Yagi et al. ................ 360/97.02 |
| 5,663,603 A | * | 9/1997 | Sakashita et al. ............ 310/91 |
| 5,701,221 A | * | 12/1997 | Taniyama et al. .......... 360/113 |
| 5,734,211 A | * | 3/1998 | Yu .............................. 310/51 |
| 5,847,476 A | * | 12/1998 | Elsing et al. .................. 310/51 |
| 5,877,572 A | * | 3/1999 | Michaels et al. ............ 310/179 |
| 5,925,946 A | * | 7/1999 | Weingord et al. ............ 310/51 |
| 5,942,819 A | * | 8/1999 | Burgess et al. ............... 310/51 |
| 5,973,421 A | * | 10/1999 | Iwabuchi ..................... 310/13 |
| 5,986,365 A | * | 11/1999 | Kuwert et al. ................ 310/51 |
| 6,040,648 A | * | 3/2000 | Kawawada et al. ........... 310/90 |
| 6,078,117 A | * | 6/2000 | Perrin et al. ................ 335/284 |
| 6,104,110 A | * | 8/2000 | Uchida et al. ................ 310/51 |
| 6,124,776 A | * | 9/2000 | Aiello et al. ................ 335/284 |
| 6,133,655 A | * | 10/2000 | Suzuki et al. ................ 310/51 |
| 6,137,196 A | * | 10/2000 | Kurasawa ..................... 310/51 |
| 6,137,200 A | * | 10/2000 | Ethirajan et al. ............. 310/90 |
| 6,188,155 B1 | * | 2/2001 | Ishizuka et al. .............. 310/71 |
| 6,242,826 B1 | * | 6/2001 | Saito et al. ................... 310/51 |
| 6,252,319 B1 | * | 6/2001 | Sudo et al. ............... 310/67 R |
| 6,252,322 B1 | * | 6/2001 | Kawawada et al. ........... 310/90 |
| 6,255,750 B1 | * | 7/2001 | Mohajerani et al. .......... 310/51 |
| 6,316,855 B1 | * | 11/2001 | Moosmann et al. .......... 310/71 |
| 6,329,730 B1 | * | 12/2001 | Neckermann et al. ........ 310/51 |
| 6,366,000 B1 | * | 4/2002 | Higashino et al. .......... 310/260 |
| 6,404,091 B1 | * | 6/2002 | Nakamura et al. .......... 310/179 |
| 6,414,580 B1 | * | 7/2002 | Sato et al. .................. 336/192 |
| 6,525,938 B1 | * | 2/2003 | Chen .......................... 361/695 |
| 6,535,035 B2 | * | 3/2003 | Ziemer ....................... 327/108 |
| 6,552,979 B1 | * | 4/2003 | Mokry et al. ............. 369/47.38 |
| 6,554,092 B2 | * | 4/2003 | Midorikawa et al. ....... 180/286 |
| 6,555,977 B1 | * | 4/2003 | Du et al. .................... 318/254 |

FOREIGN PATENT DOCUMENTS

| | | | |
|---|---|---|---|
| JP | 05260714 A | * | 10/1993 |
| JP | 05336696 A | * | 12/1993 |
| JP | 06030541 A | * | 2/1994 |

* cited by examiner

*Primary Examiner*—Burton S. Mullins
*Assistant Examiner*—Pedro J. Cuevas
(74) *Attorney, Agent, or Firm*—Young & Thompson

(57) ABSTRACT

The motor apparatus includes a motor and an insulating device. The motor such as a spindle motor is driven with pulse width modulation. Then, the insulating device insulates an object to be protected, which should be protected from a noise current generated from the motor, from the motor.

19 Claims, 3 Drawing Sheets

CURRENT NOISE INSULATED SPINDLE MOTOR

BACKGROUND OF THE INVENTION

1. Field of the Invention

The present invention relates to a motor apparatus, and more specifically relates to a motor apparatus including a motor driven with pulse width modulation.

2. Description of the Related Art

Conventionally, in the case where information recorded on a reproduction-only optical disc such as CD (Compact Disc) is reproduced optically or in the case where information is optically recorded on a recording/reproduction optical disc such as a CD-R (CD-Recordable), it is necessary to rotate an optical disc which is subject for recording or reproduction at a preset rotating speed.

At this time, as a driving apparatus to be used for the rotation, a so-called spindle motor is used the most generally. As this spindle motor, conventionally a spindle motor which is driven by a linear driver has been used generally.

Here, there will be explained below a summary of the spindle motor driven by the linear driver with reference to FIG. 3A.

As shown in FIG. 3A, a general linear driver LD is constituted so that an amplitude of a driving signal to be applied from the outside (more concretely, a driving signal having a sine waveform, for example) is controlled based on a power-supply voltage $V_{cc}$ and a load signal, which has a voltage $V_D$ of an amplitude smaller than that of the power-supply voltage $V_{cc}$ and has a waveform similar to that of the driving signal and has a current value of $I_D$, drives a load L (in the case of information reproduction or information recording, the spindle motor is the load L).

At this time, as for the conventional linear driver LD, the power-supply voltage $V_{cc}$ is reduced to the voltage $V_D$ and a load signal which coincides with a characteristic of the load L is generated so as to drive the linear driver LD. However, as a result, in the linear driver LD, an electric power $P_D$ which is represented by:

$$P_D = (V_{cc} - V_D) \times I_D \qquad (1)$$

is consumed as a dissipation power, and the linear driver LD itself is heated due to this dissipation power.

In the information reproduction apparatus, the information recording apparatus or the like in which the spindle motor is the load L, there arises a problem that since the current value $I_D$ of the load signal is large, a rise in temperature due to the heating of the linear driver LD itself occasionally becomes too large to be ignored (more concretely, for example, the rise in temperature has a bad influence upon another integrated circuit or the like).

Therefore, in recent years, a lot of researches in the structure in which a spindle motor which is driven by a PWM driver using a so-called pulse width modulation driving system instead of this linear driver LD is used to rotate an optical disc are being done.

There will be explained below a summary of the PWM driver with reference to FIG. 3B.

As shown in FIG. 3B, the PWM driver PD is constituted so that a switch in the PWM driver $P_D$ is switched to be controlled by using a driving signal having a pulse waveform applied from the outside as a switching signal, and a load signal in which a voltage changes in a pulse form between a power-supply voltage $V_{cc}$ and a ground voltage is generated to drive the load L.

In the case where the load L is driven by the PWM driver PD, since a voltage of the load signal changes in a pulse form between the power-supply voltage $V_{cc}$ and the ground voltage, the value of $(V_{cc}-V_D)$ in the above equation (1) can be approximately zero. As a result, there is an advantage that the heating of the PWM driver $P_D$ itself can be reduced.

However, in the case where the PWM driver PD having the above structure is used, there arose a problem that an electric noise current is generated and this has a bad influence upon an operation of a pickup which emits and receives a light beam for recording or reproduction.

Namely, the PWM driver PD is driven by a pulse type driving signal as mentioned above, but in this case an electric current which flows through a motor coil in the spindle motor changes abruptly. A so-called dielectric magnetic field is generated around the motor coil due to this abrupt change in the electric current, and as a result, even if the motor coil is insulated from a metallic housing of the spindle motor, a dielectric current similar to an eddy current is generated in the metallic housing.

This dielectric current flows as a noise current into the pickup, and this has a bad influence upon the operation of the integrated circuit or the like provided in the pickup (particularly a bad influence as instability of a ground voltage).

At this time, in the case where a frequency of the noise current in the PWM driver PD coincides with an operational frequency of the integrated circuit or the like, a particularly remarkable influence appears.

SUMMARY OF THE INVENTION

The present invention has been made in view of the above-described problems. It is an object of the present invention to provide a motor apparatus having a structure which is capable of effectively protecting a pickup or the like from a noise current generated from a motor driven with pulse width modulation.

The above object of the present invention can be achieved by the following motor apparatus. The motor apparatus includes a motor such as a spindle motor driven with pulse width modulation, and an insulating device for insulating an object to be protected, which should be protected from a noise current generated from the motor, from the motor.

According to the motor apparatus, since the object to be protected is insulated from the motor driven with pulse width modulation, the object to be protected can be protected from the noise current generated from the motor effectively.

In one aspect of the motor apparatus, the object to be protected is supported by a frame member such as a frame, and the insulating device is a fixing member such as a spacer made of an insulating material for fixing the motor to the frame member.

According to this aspect, since the motor driven with pulse width modulation is insulated from the frame member which supports the object to be protected, the object to be protected can be protected from the noise current generated from the motor effectively.

In another aspect of the motor apparatus, the fixing member also serves as a spacer for forming a gap with a preset length between the motor and the frame member.

According to this aspect, since the motor is fixed to the frame member by the insulating fixing member which also serves as the spacer, a number of parts of the motor apparatus is reduced so that its structure can be simplified.

In another aspect of the motor apparatus, the insulating device is made of plastic resin.

According to this aspect, transmission of the noise current to the object to be protected can be cut off effectively.

In another aspect of the motor apparatus, the object to be protected is pickup device such as a pickup for optically recording information to an information recording medium or optically reproducing information from the information recording medium. Further, the motor is a spindle motor for rotating the information recording medium.

According to this aspect, a signal which is generated in the pickup device at the time of recording or reproducing information can be protected effectively from the noise current generated from the motor.

DETAILED DESCRIPTION OF THE PREFERRED EMBODIMENTS

There will be explained below a preferable embodiment of the present invention with reference to FIGS. 1 and 2.

The following embodiment refers to a carriage mechanical unit which is provided in an information recording apparatus for optically recording information in an optical disc or an information reproducing apparatus for optically reproducing information from an optical disc, and the present invention is applied to a structure of the carriage mechanical unit which includes a spindle motor driven with pulse width modulation and a pickup for emitting a light beam for recording or reproduction to the optical disc and receiving its reflected light and outputting a corresponding light receiving signal.

Figure 1A:
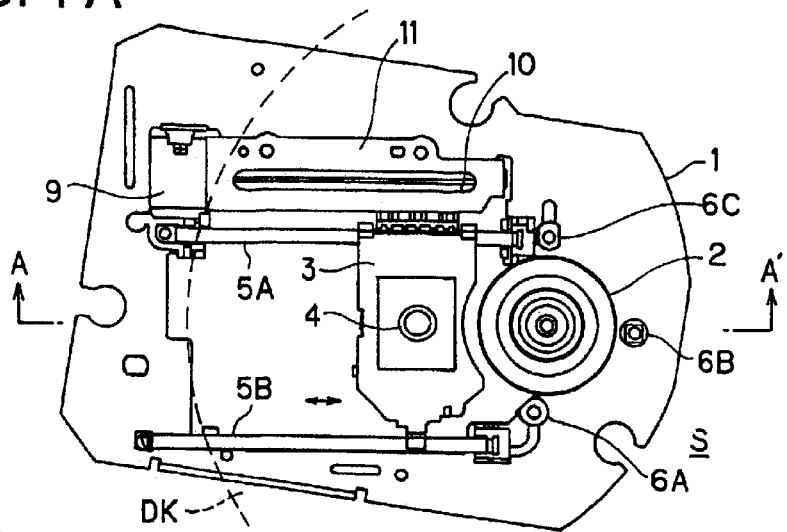
FIG. 1A is a plan view showing a structure of a carriage mechanical unit of the present embodiment.
Figure 1B:
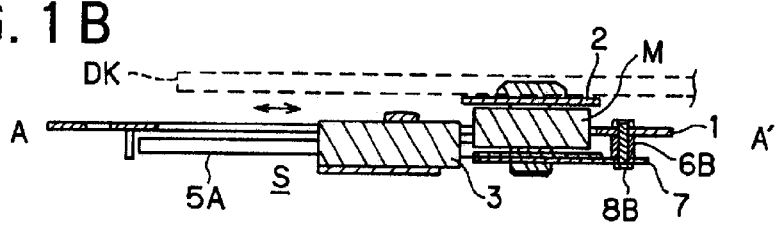
FIG. 1B is a cross section taken along line A–A' of FIG. 1A.
Figure 1C:
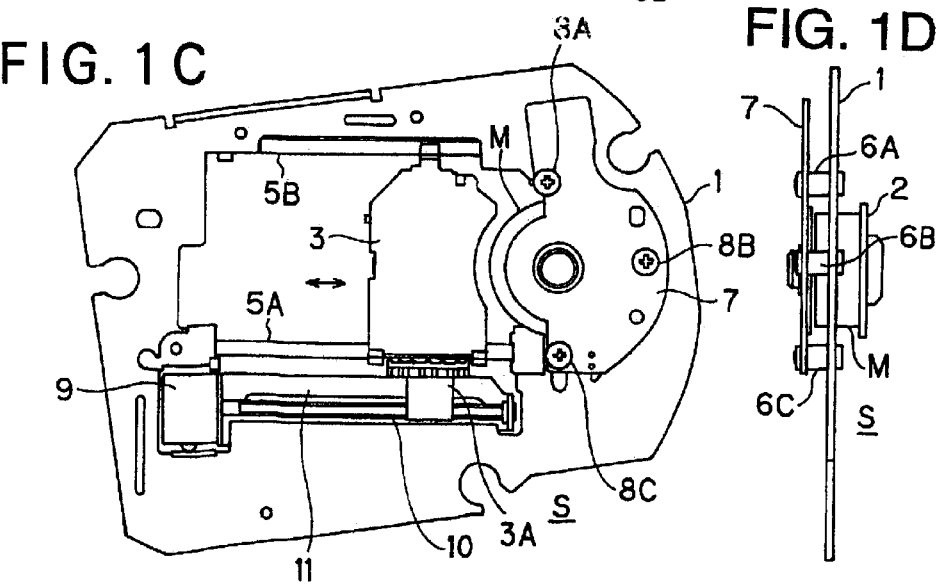
FIG. 1C is a rear view showing a structure of a carriage mechanical unit of the present embodiment.
Figure 1D:
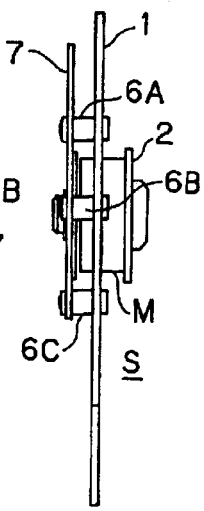
FIG. 1D is a side view showing a structure of a carriage mechanical unit of the present embodiment.
Figure 2:
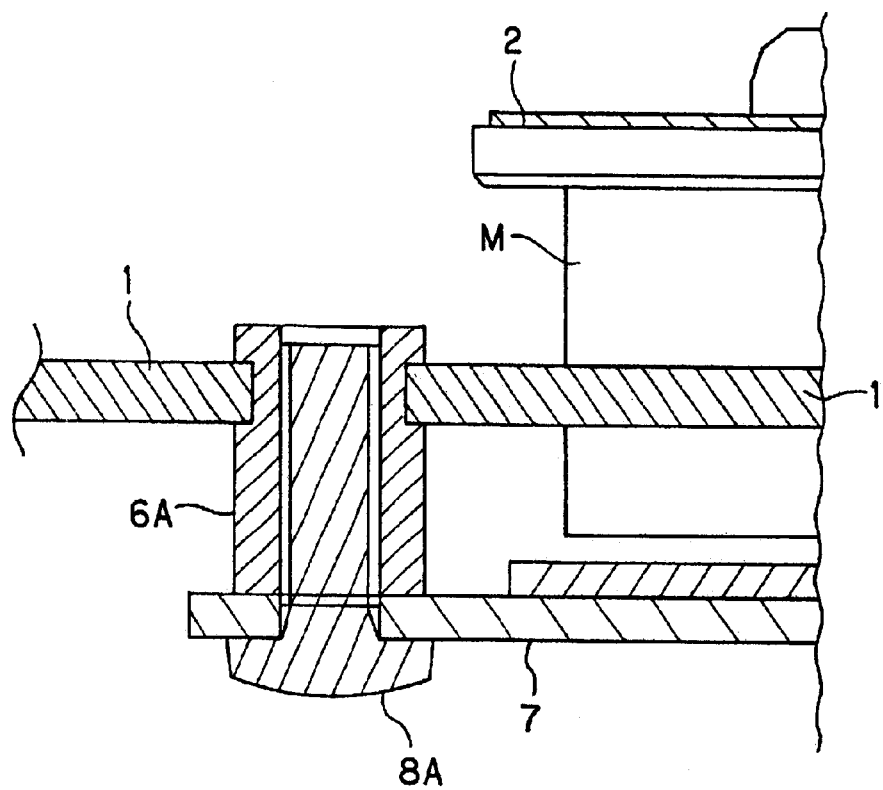
FIG. 2 is an enlarged cross section of a spacer of the embodiment.
Figure 3A:
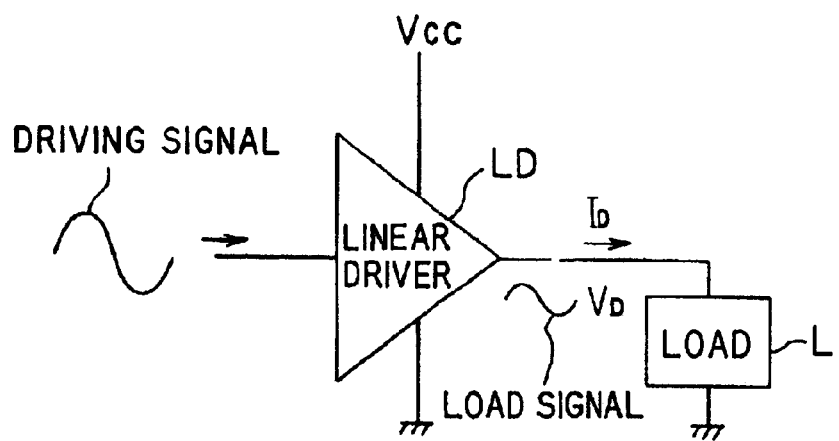
FIG. 3A is a diagram for explaining the principle of a linear driver.
Figure 3B:
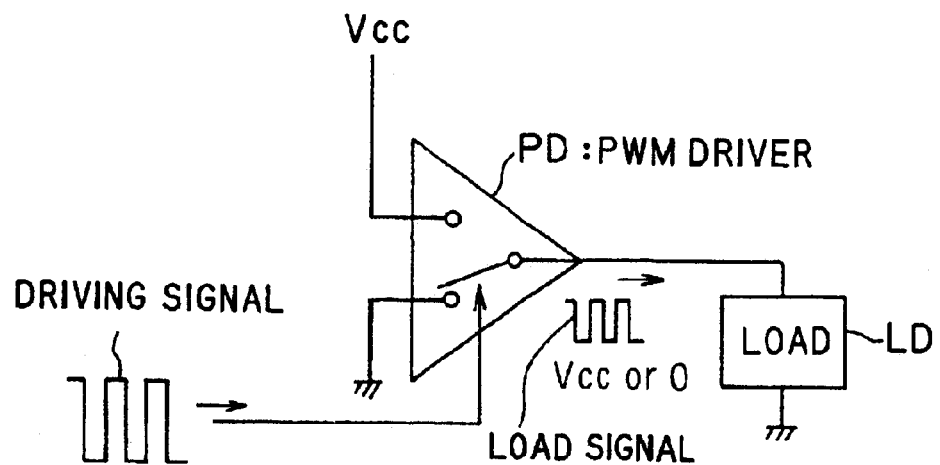
FIG. 3B is a diagram for explaining the principle of a PWM driver.

In addition, FIG. 1 is a diagram showing the structure of the carriage mechanical unit, and FIG. 2 is a partially enlarged diagram of FIG. 1.

As shown in FIG. 1, in the carriage mechanical unit S of the present embodiment, a pickup 3 as pickup device, which emits a light beam to an optical disc DK and receives its reflected light and outputs a corresponding light receiving signal, has an objective lens 4 for condensing the light beam on an information recording surface of the optical disc DK, and the pickup 3 moves to directions of arrows in FIG. 1 while being supported by supporting bars 5A and 5B. At this time, the supporting bars 5A and 5B are fixed to a frame 1 as a frame member.

Meanwhile, in order to cancel displacements between a condensing position and an information track position on the information recording surface in directions vertical to and horizontal with the information recording surface, the objective lens 4 is moved to the vertical and horizontal directions by an electro-magnetic actuator, not shown, in the pickup 3.

At this time, as for the movement to the horizontal direction, when it is necessary to move the objective lens 4 so as to exceed the preset moving range of the objective lens 4, the pickup 3 itself moves to the directions of the arrows in FIG. 1. As a result, the displacement in the horizontal direction generated at this time is canceled.

In addition, the optical pickup 3 is moved while it is being supported by a rotational shaft support 11, in a manner that a screw formed in a rotational shaft 10 rotated by a carriage motor 9 is being engaged with a partial nut 3A formed in the pickup 3 and the rotational shaft 10 is rotated.

Further, the pickup 3 includes a semiconductor laser for emitting the light beam, an optical detector for receiving a reflected light of the light beam from an optical disc, a signal generating IC (integrated Circuit) for generating the light receiving signal corresponding to light receiving intensity of the optical detector, and the like.

On the other hand, an optical disc DK on which information is recorded is fixed to a spindle motor M as a motor via a clamper 2 so as to be rotated. At this time, the spindle motor M is PWM-driven by a PWM driver, not shown.

In addition, the spindle motor M is fixed to a motor supporting plate 7. Spacers 6A through 6C (having the same shape) as circular cylindrical insulating device and fixing members are fixed to the motor supporting plate 7 via machine screws 8A through 8C, and the spacers 6A through 6C are engaged with to be fixed to the frame 1 so that the spindle motor M is fixed to the frame 1.

At this time, a gap is formed along a circumference of the spindle motor M between the spindle motor M and the frame 1, and the spacers 6A through 6C are made of plastic resin as insulating material. As a result, the frame 1 is electrically insulated from the spindle motor M. Therefore, the pickup 3 is also electrically insulated from the spindle motor M.

Next, there will be explained below shape and function of the spacers 6A through 6C with reference to FIG. 2. Here, FIG. 2 is a cross section showing a state that the motor supporting plate 7 is fixed to the frame 1 by the machine screw 8A via the spacer 6A, but the other spacers 6B and 6C have the same shape.

As shown in FIG. 2, the spacer 6A is fixed so as to be fitted into a fitting hole bored through the frame 1, and a screw thread which has a form engaged with a screw thread formed in the machine screw 8A is formed inside the spacer 6A. When the screw thread of the spacer 6A is engaged with the screw thread of the machine screw 8A, the motor supporting plate 7 is fixed to the spacer 6A by the machine screw 8A. As a result, the motor supporting plate 7 is fixed to the frame 1.

At this time, since the spacer 6A is formed by insulating plastic resin as mentioned above, the motor supporting plate 7 is insulated from the frame 1. Therefore, the spindle motor M fixed to the motor supporting plate 7 is electrically insulated from the pickup 3 supported to the frame 1 via the supporting bars 5A and 5B.

Accordingly, when the spindle motor M is PWM-driven, the dielectric current which flows in the metallic housing and the motor supporting plate 7 is isolated from flowing into the pickup 3 so that an influence upon the operation of the pickup 3 can be prevented.

In addition, since while a gap required between the frame 1 and the motor supporting plate 7 is being maintained by the spacers 6A through 6C, the frame 1 is electrically insulated from the spindle motor M, a number of parts as carriage mechanical units S is reduced and the structure can be simplified.

Further, since the spacers 6A through 6C are formed by plastic resin, transmission of the dielectric current to the pickup 3 can be cut off effectively.

The above embodiment explained the case where the spacers 6A through 6C were used as insulating members, but in another case, the components (concretely, the supporting bars 5A and 5B or the frame 1) interposed between the spindle motor M and the pickup 3 are formed by an insulating material so that the pickup 3 is insulated from the spindle motor M. With this structure, the same effect as that of the above embodiment can be obtained.

In addition, the above embodiment explained the case where the pickup 3 is protected from the flowing of the dielectric current generated from the spindle motor M, but the present invention can be widely applied to another case such as the case where the integrated circuit or the like is protected from the flowing of the dielectric current generated from the PWM-driving system motor.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-56067 filed on Feb. 28, 2000 including the specification, claims, drawings and summary is incorporated herein by reference in its entirety.

What is claimed is:

1. A motor apparatus comprising:
    a motor driven with pulse width modulation; and
    an insulating device that electrically insulates an object to be protected from a noise current generated from the motor;
    wherein the insulating device is a fixing member made of an electrically insulating material, arranged so that the insulating device fixes said motor to said object.

2. The motor apparatus according to claim 1,
    wherein the object to be protected is supported by a frame member; and
    wherein the fixing member also serves as a spacer for forming a gap with a preset length between the motor and the frame member.

3. The motor apparatus according to claim 1, wherein the insulating device is made of plastic resin.

4. The motor apparatus according to claim 1, wherein:
    the object to be protected is pickup device for optically recording information to an information recording medium or optically reproducing information from the information recording medium; and
    the motor is a spindle motor for rotating the information recording medium.

5. A motor apparatus, comprising:
    a unit frame plate;
    a motor supporting plate set parallel to the unit frame plate and mounted to the unit frame plate via plural electrically insulating spacers;
    a motor driven by pulse width modulation and mounted to the motor supporting plate,
    the motor passing through the unit frame plate by way of an opening in the unit frame plate with an air gap being formed around a circumference of the motor and a circumference of the opening in the unit frame,
    the motor being electrically insulated from the unit frame preventing dielectric current from flowing from the motor into the unit frame and components affixed thereon; and
    a pickup attached to the unit frame and arranged to emit a light beam to an optical disc and receive a light reflected from the optical disc,
    the pickup being electrically insulated from the motor.

6. The motor apparatus of claim 5, wherein an exterior surface of each of the spacers are fitted into an interior opening of a fitting hole bored through the unit frame,
    each of the spacers having an interior screw thread formed; and
    further comprising a screw threaded into the screw thread of each of the spacers,
    each have a screw head seated against the motor supporting plate.

7. The motor apparatus of claim 6, wherein each spacer is made of a plastic resin.

8. A motor apparatus, comprising:
    a unit frame plate;
    a motor supporting plate set parallel to the unit frame plate and mounted to the unit frame plate via plural spacers;
    a motor driven by pulse width modulation and mounted to the motor supporting plate,
    the motor passing through the unit frame plate by way of an opening in the unit frame plate with an air gap being formed around a circumference of the motor and a circumference of the opening in the unit frame;
    a signal pickup attached to the unit frame;
    an electrical isolation element interposed between the motor and the signal pickup isolating dielectric current generated by the motor from the signal pickup.

9. The motor apparatus of claim 8, wherein the electrical isolation element comprises signal pickup supporting bars mounting the signal pickup to the unit frame plate.

10. The motor apparatus of claim 8, wherein the electrical isolation element comprises electrically isolation regions within the frame plate.

11. The motor apparatus of claim 8, wherein the electrical isolation element comprises electrically isolation elements within the spacers.

12. The motor apparatus of claim 1, further comprising a pulse width modulation driver having an output electrically connected to the motor to supply pulse width modulated voltage to the motor.

13. The motor apparatus of claim 2, further comprising a pulse width modulation driver having an output electrically connected to the motor to supply pulse width modulated voltage to the motor.

14. The motor apparatus of claim 5, further comprising a pulse width modulation driver having an output electrically connected to the motor to supply pulse width modulated voltage to the motor.

15. The motor apparatus of claim 7, further comprising a pulse width modulation driver having an output electrically connected to the motor to supply pulse width modulated voltage to the motor.

16. The motor apparatus of claim 8, further comprising a pulse width modulation driver having an output electrically connected to the motor to supply pulse width modulated voltage to the motor.

17. The motor apparatus of claim 9, further comprising a pulse width modulation driver having an output electrically connected to the motor to supply pulse width modulated voltage to the motor.

18. The motor apparatus of claim 10, further comprising a pulse width modulation driver having an output electrically connected to the motor to supply pulse width modulated voltage to the motor.

19. The motor apparatus of claim 11, further comprising a pulse width modulation driver having an output electrically connected to the motor to supply pulse width modulated voltage to the motor.

* * * * *